US007535637B2

(12) United States Patent
Ogawa et al.

(10) Patent No.: US 7,535,637 B2
(45) Date of Patent: May 19, 2009

(54) FRESNEL LENS SHEET, TRANSMISSION TYPE SCREEN AND REAR PROJECTION TYPE DISPLAY APPARATUS

(75) Inventors: Yasufumi Ogawa, Chiba (JP); Takaaki Iwaki, Tokyo (JP); Hiroaki Uchino, Tokyo (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 11/262,768

(22) Filed: Nov. 1, 2005

(65) Prior Publication Data

US 2006/0109569 A1 May 25, 2006

(30) Foreign Application Priority Data

Nov. 5, 2004 (JP) ........................... P2004-322762

(51) Int. Cl.
*G03B 21/60* (2006.01)
*G03B 21/56* (2006.01)

(52) U.S. Cl. ........................ 359/457; 359/460; 359/742

(58) Field of Classification Search ................. 359/457, 359/742–743, 460
See application file for complete search history.

(56) References Cited

U.S. PATENT DOCUMENTS 7,075,718 B2 * 7/2006 Suzuki et al. ............... 359/457
7,277,227 B2 * 10/2007 Sekiguchi ................... 359/457
2005/0057805 A1 * 3/2005 Lee ........................... 359/460
2007/0297051 A1 * 12/2007 Huang et al. ................ 359/457
2008/0013171 A1 * 1/2008 Kumagai et al. ............ 359/457

FOREIGN PATENT DOCUMENTS

JP 61-277935 12/1986
JP 06-027535 2/1994
JP 10-003803 1/1998
JP 2004-212770 1/2003
WO WO 2004/049020 A1 6/2004

* cited by examiner

*Primary Examiner*—Christopher Mahoney
(74) *Attorney, Agent, or Firm*—Finnegan, Henderson, Farabow, Garrett & Dunner, L.L.P.

(57) ABSTRACT

A rear projection type display apparatus is disclosed wherein image light reflected upon entrance thereof into a Fresnel lens sheet of the reflection type provided on a transmission type screen is suppressed from making stray light. A Fresnel lens sheet for converting incident light incoming at an incident angle within a predetermined angular range into parallel light includes a plurality of prisms arrayed on the light entrance face of a substrate. Each prism has a refracting face for refracting the incident light and a reflecting face for reflecting the refracted light from the refracting face toward the emergence face of the substrate. At least some of the prisms are configured such that the angle of a perpendicular to the refracting face with respect to a perpendicular to the emergence face is smaller than the incident angle at the position of the prism.

9 Claims, 13 Drawing Sheets

FRESNEL LENS SHEET, TRANSMISSION TYPE SCREEN AND REAR PROJECTION TYPE DISPLAY APPARATUS

CROSS REFERENCES TO RELATED APPLICATIONS

The present invention contains subject matter related to Japanese Patent Application JP 2004-322762 filed in the Japanese Patent Office on Nov. 5, 2004, the entire contents of which being incorporated herein by reference.

BACKGROUND OF THE INVENTION

This invention relates to a Fresnel lens sheet for use with a transmission type screen and the like, a transmission type screen for use with a rear projection type display apparatus and the like, and a rear projection type display apparatus.

A rear projection type display apparatus has spread widely as a kind of image display apparatus having a large screen. In the rear projection type display apparatus, image light emitted from an image light source such as a CRT (Cathode Ray Tube), an LCD (Liquid Crystal Display) element or a DLP (Digital Light Processing) element is reflected and expanded by a projection mirror and projected to a transmission type screen from the rear side so that a viewer observes a projected image from the front face side of the transmission type screen as well known in the art.

In the rear projection type display apparatus, the incident angle of light from the projection mirror to the transmission type screen is generally set steep in order to reduce the size of the optical system, that is, to reduce the length of the light path. To this end, a Fresnel lens sheet is provided on the transmission type screen for converting the image light from the projection mirror into parallel light, or in other words, for converting the image light into light directed perpendicularly to the plane of the screen.

Fresnel lens sheets are divided into those of the refraction type and those of the reflection type. A Fresnel lens sheet of the refraction type is shown in FIG. 10. Referring to FIG. 10, the Fresnel lens sheet includes a substrate 50 having an emergence face on which prisms (microprisms) 51 having a triangular cross section are arrayed. The Fresnel lens sheet changes the advancing direction of incident light L1 by refracting the incident light L1 at a refracting face 51*a* of the prisms 51.

A Fresnel lens sheet of the reflection type is shown in FIG. 11. Referring to FIG. 11, the Fresnel lens sheet includes a substrate 50 having an entrance face on which prisms (microprisms) 52 having a triangular cross section are arrayed. The Fresnel lens sheet refracts incident light L1 at refracting faces 52*a* of the prisms 52 and reflects the refracted light toward the emergence face 50*a* side of the Fresnel lens sheet at reflecting faces 52*b* of the prisms 52 to change the advancing direction of the light. The reflected light from the reflecting faces 52*b* passes through third faces 52*c* of the prisms 52, which extend in parallel to the emergence face 50*a*, and emerges from the emergence face 50*a* of the substrate 50.

Incidentally, one of causes of deterioration of the picture quality of a rear projection type display apparatus is appearance of stray light in the Fresnel lens sheet. This is a phenomenon that part of image light is reflected at a location at which the image light should not be reflected originally and is then repetitively reflected or refracted in or by the Fresnel lens sheet. If the stray light emerges toward the viewer side, then the image looks doubly or triply.

In related art, various techniques have been proposed for suppressing appearance of stray light by a Fresnel lens sheet of the reflection type. One of such techniques is disclosed, for example, in Japanese Patent Laid-Open No. 2004-212770 (refer to paragraphs 0031 to 0045 and FIGS. 1 to 8) (hereinafter referred to as Patent Document 1) wherein a valley portion of each prism is formed in a characteristic shape so that light refracted by a refracting face of the prism or reflected by a reflecting face of the prism and coming to the valley portion may not less likely to make stray light.

SUMMARY OF THE INVENTION

Incidentally, when image light enters or emerges from a Fresnel lens sheet, part of the image light is reflected by the Fresnel lens sheet, and also the reflected light may possibly make stray light.

FIG. 12 illustrates a manner in which, when image light comes into the Fresnel lens sheet of the reflection type shown in FIG. 11, stray light is generated. In FIG. 12, part L3 of image light L1 incident to the Fresnel lens sheet of the reflection type is reflected by a refracting face 52*a* of each prism 52. After the reflected light L3 is reflected by the refracting face 52*a* of the prism 52, it enters an adjacent prism 52 and successively refracted by the reflecting face 52*b* and the refracting face 52*a* of the prism 52 to make stray light. Thereafter, the reflected light L3 enters a further adjacent prism 52 and is reflected by the refracting face 52*a* of the prism 52, whereafter it goes out from the emergence face 50*a*.

FIG. 13 illustrates a manner in which stray light is generated when image light emerges from the Fresnel lens sheet of the reflection type shown in FIG. 11. Referring to FIG. 13, image light L1 incident to the Fresnel lens sheet of the reflection type is refracted and reflected by the refracting face 52*a* and the reflecting face 52*b* of each prism 52, respectively, and comes to the emergence face 50*a* of the substrate 50. However, part L4 of the image light coming to the emergence face 50*a* is reflected by the emergence face 50*a* and returns to the original prism 52. Then, the returning light L4 is reflected by the reflecting face 52*b* of the original prism 52 and enters an adjacent prism 52. Then, the light L4 is successively refracted by the reflecting face 52*b* and the refracting face 52*a* of the adjacent prism 52 to make stray light. Thereafter, the light L4 enters a further adjacent prism 52 and is reflected by the refracting face 52*a* of the prism 52, whereafter it emerges from the emergence face 50*a*.

However, the technique disclosed in Patent Document 1 is directed to suppression of light entering a Fresnel lens sheet of the reflection type (light refracted by refracting faces of the prisms) from making stray light. However, the technique of Patent Document 1 cannot suppress image light reflected upon entrance thereof (image light reflected by the refracting faces of the prisms) from making stray light as described hereinabove with reference to FIG. 12.

Further, the technique disclosed in Patent Document 1 is directed to suppression of light coming to valley portions of prisms from making stray light. However, the technique of Patent Document 1 cannot suppress image light (returning light) reflected upon emergence thereof from a Fresnel lens sheet of the reflection type from being reflected or refracted at portions of the prisms other than the valley portions to make stray light as described hereinabove with reference to FIG. 13.

It is an object of the present invention to provide a rear projection type display apparatus wherein image light reflected upon entrance thereof into a Fresnel lens sheet of the reflection type provided on a transmission type screen is suppressed from making stray light. It is another object of the present invention to provide a rear projection type display apparatus wherein image light reflected upon emergence thereof from a Fresnel lens sheet of the reflection type provided on a transmission type screen is suppressed from making stray light.

In order to attain the objects described above, according to an embodiment of the present invention, there is provided a Fresnel lens sheet for converting incident light incoming at an incident angle within a predetermined angular range into parallel light, including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, and a third face for passing the reflected light from the reflecting face therethrough, at least some of the prisms being configured such that the angle of a perpendicular to the refracting face with respect to a perpendicular to the emergence face is smaller than an incident angle of light at the position of each of the prisms.

The Fresnel lens sheet is formed as a Fresnel lens sheet wherein the prisms each of which has a refracting face for refracting the incident light, a reflecting face for reflecting the refracted light from the refracting face toward the light emergence face side of the substrate, and a third face for passing the reflected light from the reflecting face therethrough are arrayed on the light entrance face side of the substrate, that is, formed as a Fresnel lens sheet of the reflection type.

The Fresnel lens sheet is used to convert incident light entering at an incident angle within a predetermined angular range into parallel light. Further, at least some of the prisms are configured such that the angle of a perpendicular to the refracting face with respect to a perpendicular to the emergence face is smaller than an incident angle of light at the position of each of such prisms.

In each of the prisms wherein the perpendicular to the refracting face has such an angle as described above, the angle of light reflected by the refracting face, that is, the angle of the light with respect to the perpendicular to the emergent face, is equal to or smaller than the incident angle. In other words, the advancing direction of the reflected light at the refracting face is the same direction as that of the incident light or a direction in which the reflected light is spaced away from an adjacent prism by a greater amount than the incident light.

Consequently, such a situation that the reflected light enters an adjacent prism as in the case of the Fresnel lens sheet of the reflection type described hereinabove with reference to FIG. 12 is eliminated. Therefore, image light reflected when it enters the Fresnel lens sheet of the reflection type can be suppressed from making stray light.

The Fresnel lens sheet is advantageous in that light reflected upon entrance to a Fresnel lens sheet of the reflection type can be suppressed from making stray light.

Preferably, the Fresnel lens sheet is configured such that, as an example, the angle of the reflecting face of each of the prisms with respect to the perpendicular to the emergence face is smaller than ½ the angle of the refracted light with respect to the perpendicular to the emergence face.

In each of the prisms whose reflecting face has such an angle as described above, that part (returning light) of the image light reflected by the reflecting face and coming to the emergence face which is reflected by the emergence face and returns to the original prism returns to the same position as the original reflected position of the reflecting face or to a position displaced to the extremity of the prism from the original reflected position of the reflecting face. Accordingly, the returning light advances, after it is refracted by the refracting face, along the same light path as that upon the incidence to the Fresnel lens sheet or at a place spaced from the adjacent prism by a greater amount than at the place at which it has entered the Fresnel lens sheet.

Consequently, such a situation that the returning light enters the adjacent prism as in the case of the Fresnel lens sheet of the reflection type in the past described hereinabove with reference to FIG. 13 is eliminated. Therefore, light reflected when it emerges from the Fresnel lens sheet is suppressed from making stray light.

The Fresnel lens sheet is advantageous in that light reflected upon emergence from a Fresnel lens sheet of the reflection type can be suppressed from making stray light.

According to another embodiment of the present invention, there is provided a Fresnel lens sheet for converting incident light incoming at an incident angle within a predetermined angular range into parallel light, including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, a third face for passing the reflected light from the reflecting face therethrough, and a fourth face positioned between the refracting face and the third face, at least some of the prisms being configured such that the angle of a perpendicular to the refracting face with respect to a perpendicular to the emergence face is smaller than an incident angle of light at the position of each of the prisms.

In the Fresnel lens sheet, the prisms each of which has a refracting face for refracting the incident light, a reflecting face for reflecting the refracted light from the refracting face toward the light emergence face side of the substrate, a third face for passing the reflected light from the reflecting face therethrough, and a fourth face positioned between the refracting face and the third face, are arrayed on the light entrance face side of the substrate. Therefore, the Fresnel lens sheet is formed as a Fresnel lens sheet of the reflection type. However, each of the prisms has a cross section not of a triangular shape but of a quadrangular shape.

The Fresnel lens sheet is used to convert incident light entering at an incident angle within a predetermined angular range into parallel light. Further, at least some of the prisms are configured such that the angle of a perpendicular to the refracting face with respect to a perpendicular to the emergence face is smaller than an incident angle of light at the position of each of such prisms.

In each of the prisms wherein the perpendicular to the refracting face has such an angle as described above, the angle of light reflected by the refracting face, that is, the angle of the light with respect to the perpendicular to the emergent face, is equal to or smaller than the incident angle. In other words, the advancing direction of the reflected light at the refracting face is the same direction as that of the incident light or a direction in which the reflected light is spaced away from an adjacent prism by a greater amount than the incident light.

Consequently, such a situation that the reflected light enters an adjacent prism as in the case of the Fresnel lens sheet of the reflection type described hereinabove with reference to FIG. 12 is eliminated. Therefore, image light reflected when it enters the Fresnel lens sheet of the reflection type can be suppressed from making stray light.

Further, in the Fresnel lens sheet, the fourth face is provided between the refracting face and the third face (transmission face) of each of the prisms. The fourth face can be utilized in such a manner as described in (1) to (5) below.

(1) If the length and/or the angle of the fourth face are changed, then the angle of the refracting face or the reflecting face of each prism with respect to the emergence face can be adjusted arbitrarily irrespective of the pitch between adjacent ones of the prisms or the end angle of the prisms. In other words, where the fourth face is utilized as a face for adjustment of the shape of the prism, the degree of freedom in design of the refracting face or the reflecting face is enhanced.

Consequently, in such a case that the incident angle of light is small, it is possible to set the angle of the refracting face in a corresponding relationship so that reflected light upon entrance into the Fresnel lens sheet can be suppressed from making stray light.

Further, the angle of the reflecting face can be adjusted arbitrarily to adjust the advancing direction of emerging light from the Fresnel lens sheet arbitrarily irrespective of the pitch between adjacent ones of the prisms or the end angle of the prisms.

(2) If the length and/or the angle of the fourth face are changed, then the pitch between adjacent ones of the prisms or the height of the prisms can be set arbitrarily without changing the angle of the refracting face or the reflecting face.

(3) Generally, in a Fresnel lens sheet of the reflection type, where the incident angle of light is small, if the entire sheet is in an inclined state or the entire lens faces of the prisms are in an inclined state, then the incident light sometimes passes, after it is refracted by the refracting faces of the prisms, through the prisms as it is without coming to the reflecting faces from a cause of an error in dimension upon production of the prisms or an error in mounting of the prisms on the substrate. This passage of light through the prisms can be prevented if the regions of the reflecting faces which are actually used for reflection are narrowed by adjusting the pitch between adjacent ones of the prisms or the height of the prisms. However, where the prisms have a triangular sectional shape, since the degree of freedom in design is low, such adjustment of the pitch or the height is not easy. In contrast, with the present Fresnel lens sheet, since the degree of freedom in design is increased by the presence of the fourth face and a Fresnel lens sheet having a greater margin can be designed, such passage of light as described above can be prevented.

(4) Since the angle of the fourth face can be set such that the prisms have an arbitrary draft angle, production of a metal mold for forming the prisms is facilitated and also taking out of the prisms from the metal mold is facilitated.

(5) When a metal mold for molding of prisms is worked, a problem that a tip portion of the metal mold is bent or curved occurs frequently. A Fresnel lens sheet having prisms molded using such a metal mold as described above has a problem in that, since the angle of part of the reflecting face of a prism is deviated, that is, since an apex defined by the reflecting face and the third face is deformed, the reflected light makes stray light or a ray of light is disturbed to cause a line to be formed on an image, resulting in the problem of deterioration of the picture quality. If the pitch between adjacent ones of the prisms or the height of the prisms is adjusted to narrow a region to be actually utilized for reflection from within the reflecting face so as not to utilize the region in which the angle is deviated, then even if the apex is in a somewhat deformed condition, this does not have an influence on the reflected light. Consequently, appearance of such stray light or a line on an image as described above can be prevented. However, such adjustment as described above is not easy with the prisms having a triangular cross section because the degree of freedom in design is low. In contrast, with the present Fresnel lens sheet, since the presence of the fourth face increases the degree of freedom in design and makes it possible to design a Fresnel lens sheet having a greater margin, even if the finish of the metal mold is not very good, it is easily possible to prevent appearance of such stray light or of a line on an image thereby to prevent deterioration of the picture quality.

The Fresnel lens sheet is advantageous in that, also in such a case that the incident angle of image light to the Fresnel lens sheet of the reflection type is small, light reflected upon entrance thereof can be suppressed from making stray light, and that the advancing direction of emerging light from the Fresnel lens sheet can be adjusted arbitrarily irrespective of the pitch between adjacent ones of the prisms or the end angle of the prisms. The Fresnel lens sheet is further advantageous in that the pitch between adjacent ones of the prisms or the height of the prisms can be set arbitrarily without changing the angle of the refracting face or the reflecting face of each prism, and that passage of light through the prisms when the entire sheet is in an inclined state or the entire prisms are in an inclined state can be prevented readily. The Fresnel lens sheet is advantageous also in that the prisms can be provided with an arbitrary draft angle and that, even if the finish of a metal mold for forming the prisms is not very good, it is easily possible to prevent appearance of such stray light or of a line on an image thereby to prevent deterioration of the picture quality.

Preferably, the Fresnel lens sheet is configured such that, as an example, the angle of the reflecting face of each of the prisms with respect to the perpendicular to the emergence face is smaller than ½ the angle of the refracted light with respect to the perpendicular to the emergence face.

In each of the prisms whose reflecting face has such an angle as described above, that part (returning light) of the image light reflected by the reflecting face and coming to the emergence face which is reflected by the emergence face and returns to the original prism returns to the same position as the original reflected position of the reflecting face or to a position displaced to the extremity of the prism from the original reflected position of the reflecting face. Accordingly, the returning light advances, after it is refracted by the reflecting face, along the same light path as that upon the incidence to the Fresnel lens sheet or at a place spaced from the adjacent prism by a greater amount than at the place at which it has entered the Fresnel lens sheet.

Consequently, such a situation that the returning light enters the adjacent prism as in the case of the Fresnel lens sheet of the reflection type in the past described hereinabove with reference to FIG. 13 is eliminated. Therefore, light reflected when it emerges from the Fresnel lens sheet is suppressed from making stray light.

The Fresnel lens sheet is advantageous in that light reflected upon emergence from a Fresnel lens sheet of the reflection type can be suppressed from making stray light.

According to a further embodiment of the present invention, there is provided a transmission type screen including a Fresnel lens sheet for converting incident light incoming at an incident angle within a predetermined angular range into parallel light, the Fresnel lens sheet including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, and a third face for passing the reflected light from the reflecting face therethrough, at least some of the prisms being configured such that the angle of a perpendicular to the refracting face with respect to a perpendicular to the emergence face is smaller than an incident angle of light at the position of each of the prisms.

The transmission type screen includes, as a Fresnel lens sheet of the reflection type, the Fresnel lens sheet of the first-mentioned embodiment described above. Accordingly, with the transmission type screen, light reflected when it enters the Fresnel lens sheet of the reflection type can be suppressed from making stray light.

The transmission type screen is advantageous in that light reflected upon entrance to a Fresnel lens sheet of the reflection type provided therein can be suppressed from making stray light.

Preferably, the transmission type screen is configured such that, for example, the angle of the reflecting face of each of the prisms with respect to the perpendicular to the emergence face is smaller than ½ the angle of the refracted light with respect to the perpendicular to the emergence face.

The transmission type screen is advantageous in that light reflected upon emergence thereof from the Fresnel lens sheet can be suppressed from making stray light.

According to a still further embodiment of the present invention, there is provided a transmission type screen including a Fresnel lens sheet for converting incident light incoming at an incident angle within a predetermined angular range into parallel light, the Fresnel lens sheet including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, a third face for passing the reflected light from the reflecting face therethrough, and a fourth face positioned between the refracting face and the third face, at least some of the prisms being configured such that the angle of a perpendicular to the refracting face with respect to a perpendicular to the emergence face is smaller than an incident angle of light at the position of each of the prisms.

The transmission type screen includes, as a Fresnel lens sheet of the reflection type, the Fresnel lens sheet of the second-mentioned embodiment described above. Accordingly, with the transmission type screen, light reflected when it enters the Fresnel lens sheet of the reflection type can be suppressed from making stray light. Further, the fourth face provided between the refracting face of each of the prisms of the Fresnel lens sheet and the emergence face of the substrate can be utilized in such a manner as described in (1) to (5) above.

The transmission type screen is advantageous in that, also in such a case that the incident angle of image light to the Fresnel lens sheet of the reflection type provided therein is small, light reflected upon entrance thereof into the Fresnel lens sheet can be suppressed from making stray light, and that the advancing direction of emerging light from the Fresnel lens sheet can be adjusted arbitrarily irrespective of the pitch between adjacent ones of the prisms or the end angle of the prisms of the Fresnel lens sheet. The transmission type screen is further advantageous in that the pitch between adjacent ones of the prisms or the height of the prisms can be set arbitrarily without changing the angle of the refracting face or the reflecting face of each prism of the Fresnel lens sheet, and that passage of light through the prisms when the entire Fresnel lens sheet is in an inclined state or the entire lens faces of the prisms are in an inclined state can be prevented readily. The transmission type screen is advantageous also in that the prisms of the Fresnel lens sheet can be provided with an arbitrary draft angle and that, even if the finish of a metal mold for forming the prisms is not very good, it is easily possible to prevent appearance of such stray light or of a line on an image thereby to prevent deterioration of the picture quality.

Preferably, the transmission type screen is configured such that, for example, the angle of the reflecting face of each of the prisms with respect to the perpendicular to the emergence face is smaller than ½ the angle of the refracted light with respect to the perpendicular to the emergence face.

The transmission type screen is advantageous in that light reflected upon emergence thereof from the Fresnel lens sheet can be suppressed from making stray light.

According to a yet further embodiment of the present invention, there is provided a rear projection type display apparatus including an image light source for emitting image light, and a transmission type screen to which the image light is projected at an incident angle within a predetermined angular range from the rear face side, the transmission type screen including a Fresnel lens sheet for converting incident light into parallel light, the Fresnel lens sheet including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, and a third face for passing the reflected light from the reflecting face therethrough, at least some of the prisms being configured such that the angle of a perpendicular to the refracting face with respect to a perpendicular to the emergence face is smaller than an incident angle of light at the position of each of the prisms.

The rear projection type display apparatus includes a transmission type screen to which the image light is projected at an incident angle within a predetermined angular range from the rear face side, and uses, as the transmission type screen, the transmission type screen of the third-mentioned embodiment described above. Accordingly, with the rear projection type display apparatus, light reflected when it enters the Fresnel lens sheet of the reflection type provided in the transmission type screen can be suppressed from making stray light.

The rear projection type display apparatus is advantageous in that image light reflected upon entrance to a Fresnel lens sheet of the reflection type provided in a transmission type screen which is provided in a rear projection type display apparatus wherein image light is projected at an incident angle within a predetermined angular range to the transmission type screen from the rear face side can be suppressed from making stray light.

Preferably, the rear projection type display apparatus is configured such that, for example, the angle of the reflecting face of each of the prisms with respect to the perpendicular to the emergence face is smaller than ½ the angle of the refracted light with respect to the perpendicular to the emergence face.

The rear projection type display apparatus is advantageous in that light reflected upon emergence thereof from the Fresnel lens sheet can be suppressed from making stray light.

According to a yet further embodiment of the present invention, there is provided a rear projection type display apparatus including an image light source for emitting image light, and a transmission type screen to which the image light is projected at an incident angle within a predetermined angular range from the rear face side, the transmission type screen including a Fresnel lens sheet for converting incident light into parallel light, the Fresnel lens sheet including a substrate having a light entrance face and a light emergence face, and a plurality of prisms arrayed on the light entrance face side of the substrate, each of the prisms having a refracting face for refracting the incident light, a reflecting face for reflecting the refracted light from the refracting face toward the light emergence face side of the substrate, a third face for passing the reflected light from the reflecting face therethrough, and a fourth face positioned between the refracting face and the third face, at least some of the prisms being configured such that the angle of a perpendicular to the refracting face with respect to a perpendicular to the emergence face is smaller than an incident angle of light at the position of each of the prisms.

The rear projection type display apparatus includes a transmission type screen to which the image light is projected at an incident angle within a predetermined angular range from the rear face side, and uses, as the transmission type screen, the transmission type screen of the third-mentioned embodiment described above. Accordingly, with the rear projection type display apparatus, light reflected when it enters the Fresnel lens sheet of the reflection type provided in the transmission type screen can be suppressed from making stray light. Further, the fourth face provided between the refracting face of each of the prisms of the Fresnel lens sheet and the emergence face of the substrate can be utilized in such a manner as described in (1) to (5) above.

The rear projection type display apparatus is advantageous in that, also in such a case that the incident angle of light to the transmission type screen provided in a rear projection type display apparatus wherein image light is projected at an incident angle within a predetermined angular range to the transmission type screen from the rear face side is small, image light reflected upon entrance thereof into the Fresnel lens sheet of the reflection type provided in the transmission type screen can be suppressed from making stray light, and that the advancing direction of emerging light from the Fresnel lens sheet can be adjusted arbitrarily irrespective of the pitch between adjacent ones of the prisms or the end angle of the prisms of the Fresnel lens sheet. The rear projection type display apparatus is further advantageous in that the pitch between adjacent ones of the prisms or the height of the prisms can be set arbitrarily without changing the angle of the refracting face or the reflecting face of each prism of the Fresnel lens sheet, and that passage of light through the prisms when the entire Fresnel lens sheet is in an inclined state or the entire lens faces of the prisms are in an inclined state can be prevented readily. The rear projection type display apparatus is advantageous also in that the prisms of the Fresnel lens sheet can be provided with an arbitrary draft angle and that, even if the finish of a metal mold for forming the prisms is not very good, it is easily possible to prevent appearance of such stray light or of a line on an image thereby to prevent deterioration of the picture quality.

Preferably, the rear projection type display apparatus is configured such that, for example, the angle of the reflecting face of each of the prisms with respect to the perpendicular to the emergence face is smaller than ½ the angle of the refracted light with respect to the perpendicular to the emergence face.

The rear projection type display apparatus is advantageous in that light reflected upon emergence thereof from the Fresnel lens sheet can be suppressed from making stray light.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
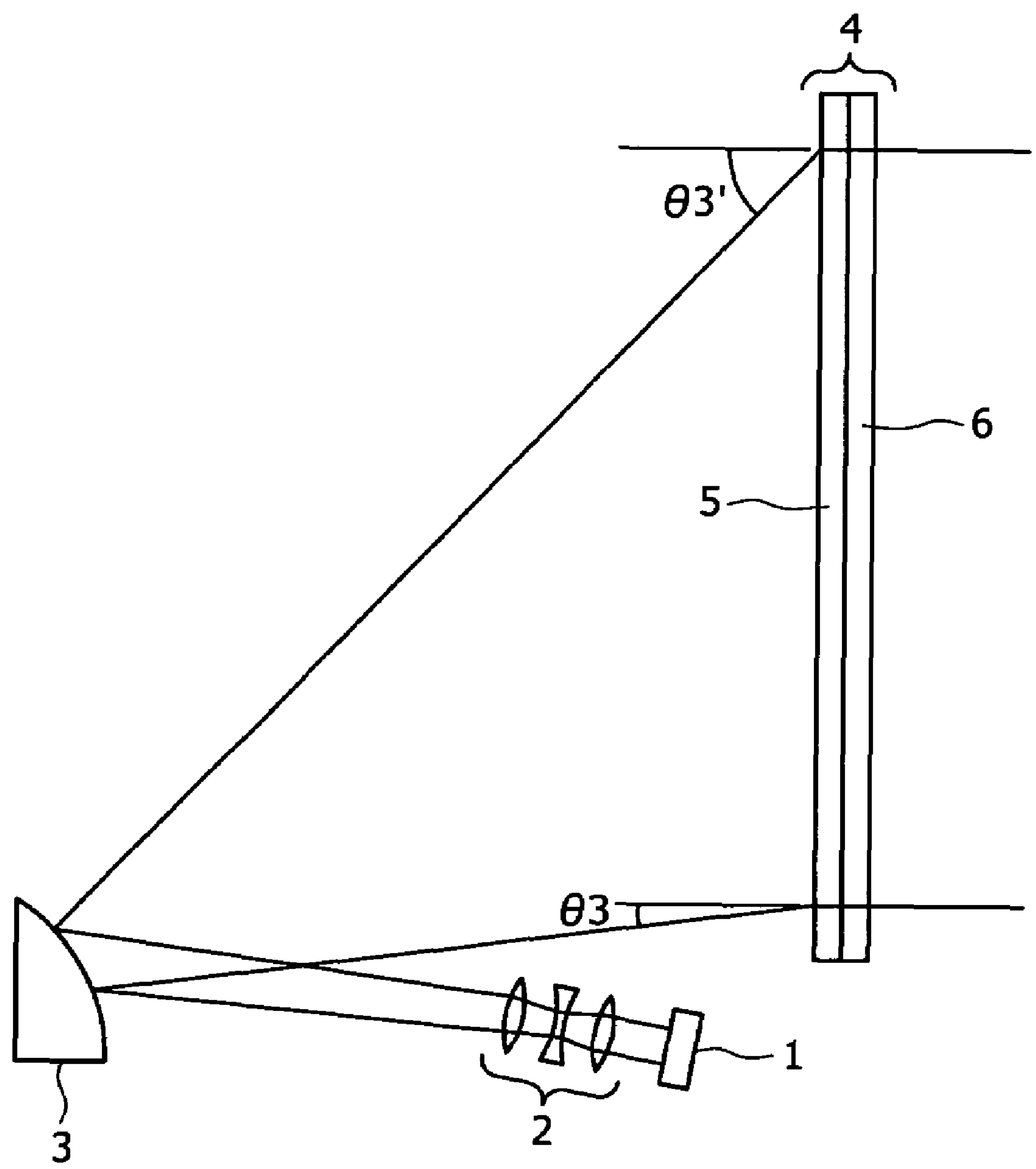
FIG. 1 is a schematic view showing a general configuration of an optical system of a rear projection type display apparatus to which the present invention is applied.

Referring to FIG. 1, there is shown a general configuration of an optical system of a rear projection type display apparatus to which the present invention is applied. An image light source 1 is formed from, for example, a CRT (Cathode Ray Tube), an LCD (Liquid Crystal Display) element or a DLP (Digital Light Processing) element and is driven with image data from an image signal processing system (not shown) to emit image light.

The image light emitted from the image light source 1 is expanded by a projection lens 2 formed from a combination of a plurality of lenses and enters a projection mirror 3. Then, the image light is reflected and expanded by the projection mirror 3 and projected on a transmission type screen 4 from the rear side. Then, the image light emerges from the transmission type screen 4 toward a viewer.

The incident angle of the image light from the projection mirror 3 to the transmission type screen 4 exhibits its minimum value $\theta 3$ at a lower end portion of the transmission type screen 4 and has an angle which increases toward an upper end portion side of the transmission type screen 4. Then, the incident angle exhibits a maximum value $\theta 3'$ at an upper end portion of the transmission type screen 4.

Here, it is assumed that, as an example, the minimum value $\theta 3$ and the maximum value $\theta 3'$ of the incident angle are 61° and 70°, respectively. In other words, the image light is projected within an angular range of 61° to 70° to the transmission type screen 4. It is to be noted that FIG. 1 does not indicate the angular range of 61° to 70° accurately.

The transmission type screen 4 includes a Fresnel lens sheet 5 and a lenticular lens sheet 6 disposed in order as viewed from the light entrance face side, that is, as viewed from the projection mirror 3 side. The Fresnel lens sheet 5 converts the image light from the projection mirror 3 into parallel light, that is, into light perpendicular to the plane of the transmission type screen 4.

The lenticular lens sheet 6 deflects the image light converted into parallel light by the Fresnel lens sheet 5 to a horizontal direction or a vertical direction by a refraction effect of the lenses thereof in order to expand the angular field of view. The lenticular lens sheet 6 may have a configuration same as that of an existing popular lenticular lens sheet.

WORKING EXAMPLE 1

Figure 2:
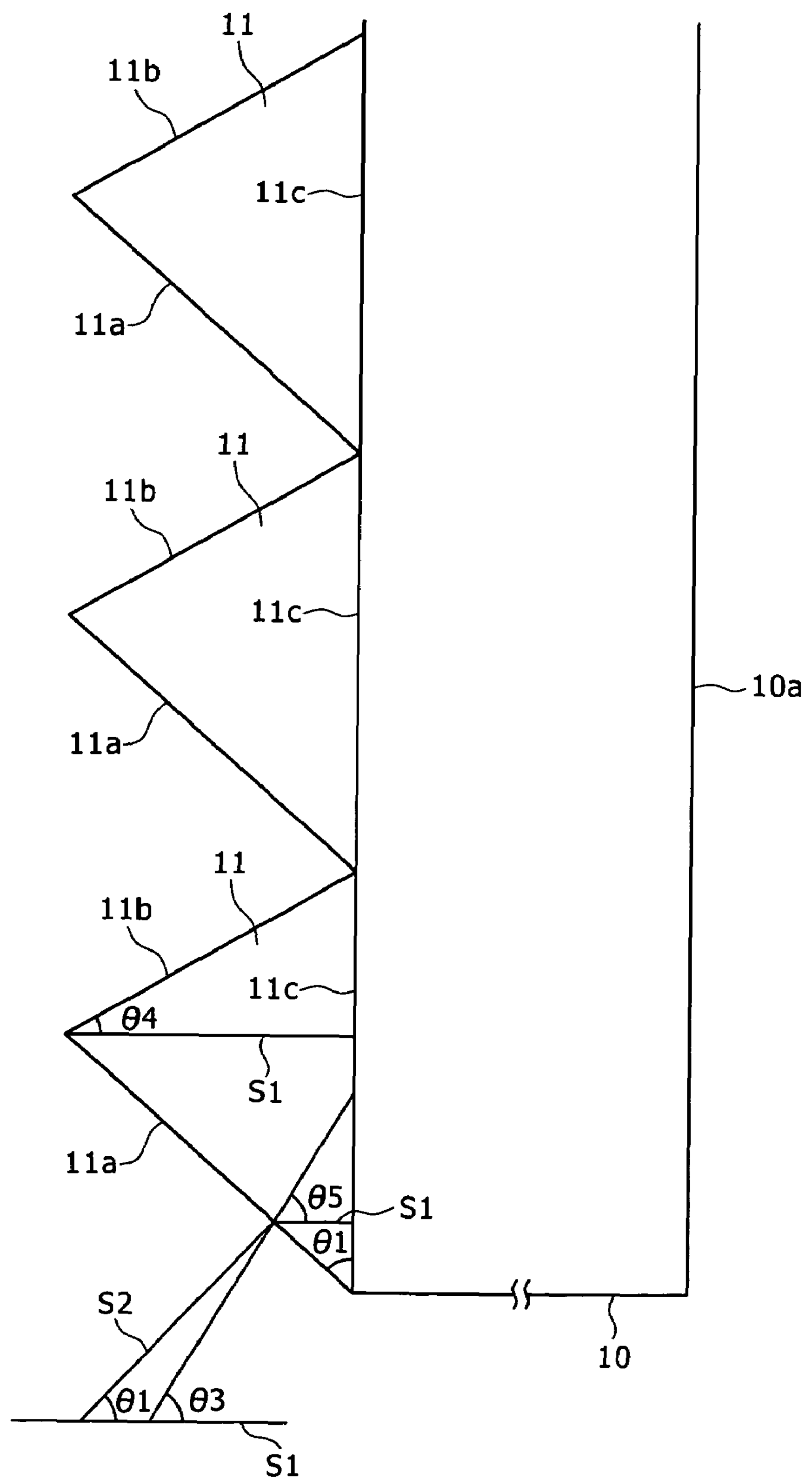
FIG. 2 is a schematic view showing a sectional structure of a working example of a Fresnel lens sheet shown in FIG. 1.

Now, a working example of the Fresnel lens sheet 5 shown in FIG. 1 is described. FIG. 2 shows a sectional structure of the Fresnel lens sheet 5 according to the working example. The Fresnel lens sheet 5 includes a plurality of prisms (microprisms) 11 arrayed on the light entrance face side (left side in FIG. 2) of a substrate 10 which may be made of a resin material or a glass material, and consequently is formed as a Fresnel lens sheet of the reflection type. Each of the prisms 11 has a refracting face 11*a* for refracting incident light, a reflecting face 11*b* for reflecting the refracted light from the refracting face 11*a* toward the emergence face 10*a* side of the substrate 10, and a third face 11*c* extending in parallel to the emergence face 10*a* for passing the reflected light from the reflecting face 11*b* therethrough.

The angle $\theta 1$ of a perpendicular s2 to the refracting face 11*a* of each prism 11 with respect to a perpendicular s1 to the emergence face 10*a* of the substrate 10 is 60.5°. The angle $\theta 1$ is equal to the angle of the refracting face 11*a* of the prism 11 with respect to the emergence face 10*a* of the substrate 10. Accordingly, the angle $\theta 1$ is smaller than any angle within the incident angular range of $\theta 3$ to $\theta 3'$ (61° to 70°) to the transmission type screen 4 of FIG. 1. It is to be noted that, in FIG. 2, the angle $\theta 1$ is shown somewhat smaller than 60.5° for the convenience of illustration.

The angle $\theta 4$ of the reflecting face 11*b* of each prism 11 with respect to the emergence face 10*a* is 29°. On the other hand, at a portion of the Fresnel lens sheet 5 at which image light enters at the minimum incident angle $\theta 3=61°$, the angle $\theta 5$ of refracted light from the refracting face 11*a* with respect to the perpendicular s1 to the emergence face 10*a* is 60.8°. Further, at the other portions of the Fresnel lens sheet 5, the angle $\theta 5$ of the refracted light is greater than 60.8°. Accordingly, the angle $\theta 4$ is smaller, at all locations of the Fresnel lens sheet 5, than ½ the angle $\theta 5$ of refracted light from the refracting face 11*a*.

Figure 3:
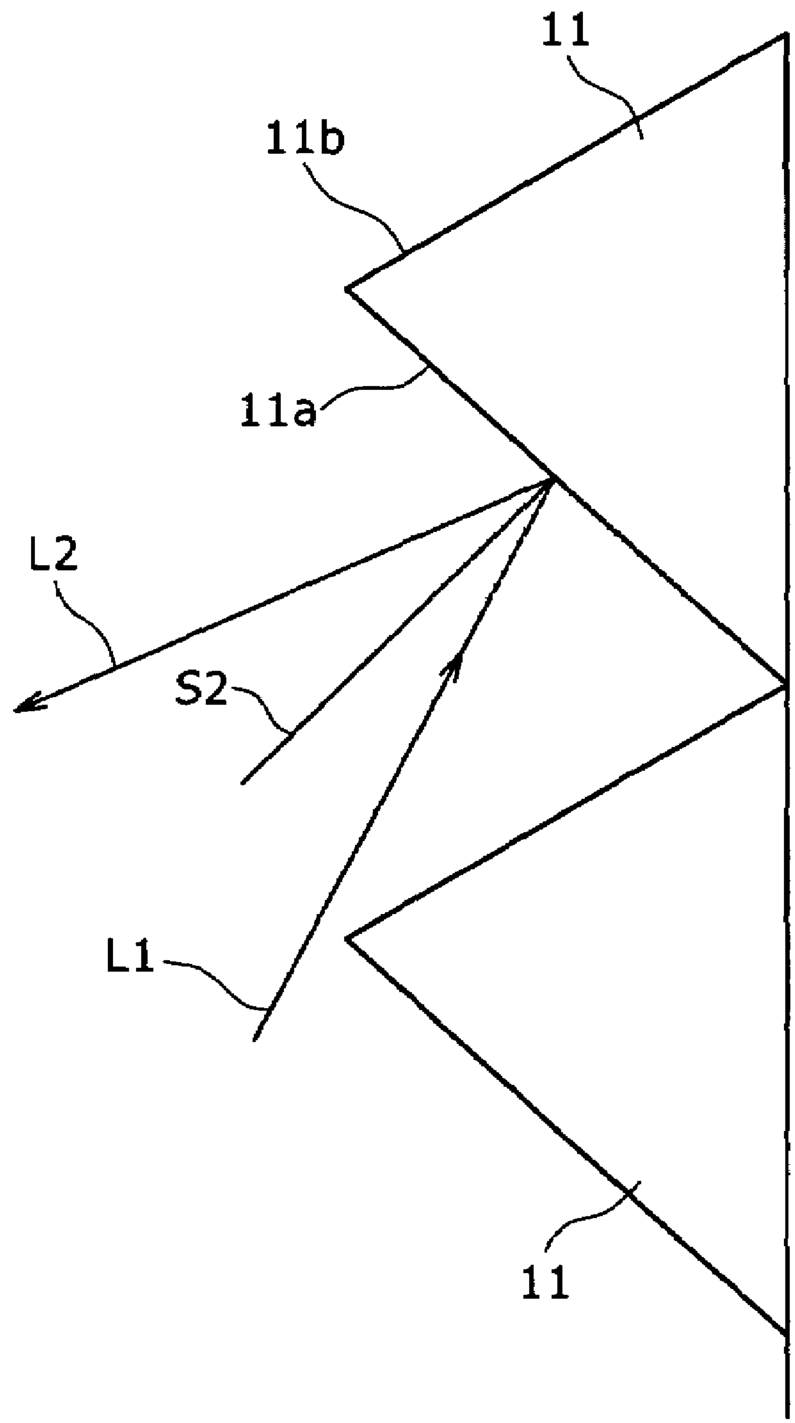
FIG. 3 is a schematic view illustrating a manner in which appearance of stray light when light enters the Fresnel lens sheet of FIG. 2 is suppressed.

FIG. 3 illustrates a manner in which appearance of stray light when image light enters the Fresnel lens sheet 5 is suppressed. Referring to FIG. 3, part L2 of image light L1 incident to the Fresnel lens sheet 5 is reflected by the refracting face 11*a* of the prism 11.

However, from the relationship between the angle $\theta 1$ of the refracting face 11*a* and the incident angular range of $\theta 3$ to $\theta 3'$, the angle of the reflected light L2 at the refracting face 11*a*, that is, the angle with respect to the perpendicular s1 to the emergence face 10*a*, is smaller than the incident angle of the image light L1 at all locations of the Fresnel lens sheet 5. In other words, the advancing direction of the reflected light L2 at the refracting face 11*a* is a direction in which the reflected light L2 is spaced away from the prism 11 by a greater amount when compared with the incident light L1.

Figure 12:
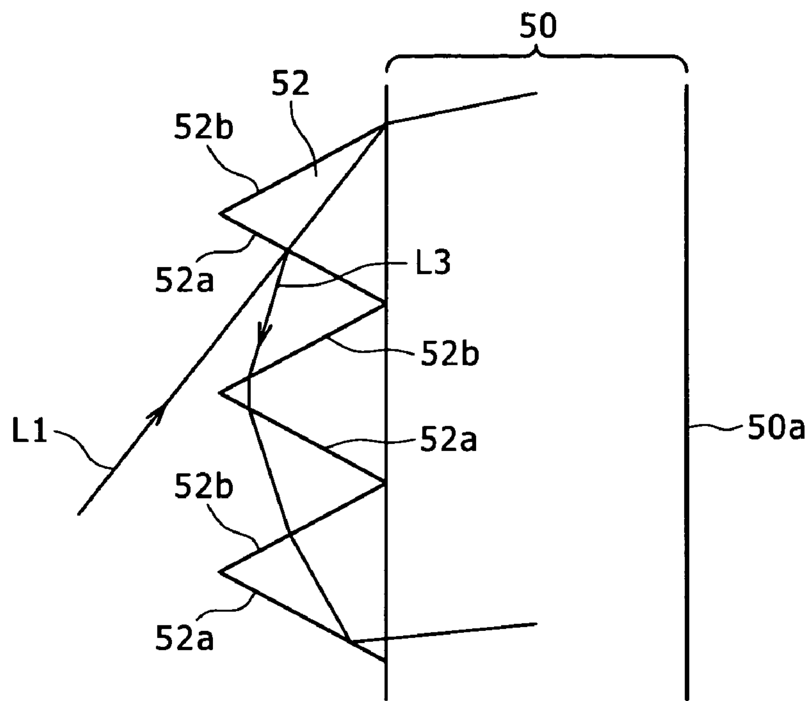
FIG. 12 is a schematic view illustrating a manner in which stray light appears when light enters the Fresnel lens sheet of FIG. 11.

Consequently, such a situation that the reflected light L2 enters an adjacent prism 11 as in the case of the Fresnel lens sheet of the reflection type described hereinabove with reference to FIG. 12 is eliminated. Therefore, image light reflected when it enters the Fresnel lens sheet 5 can be suppressed from making stray light.

Figure 4:
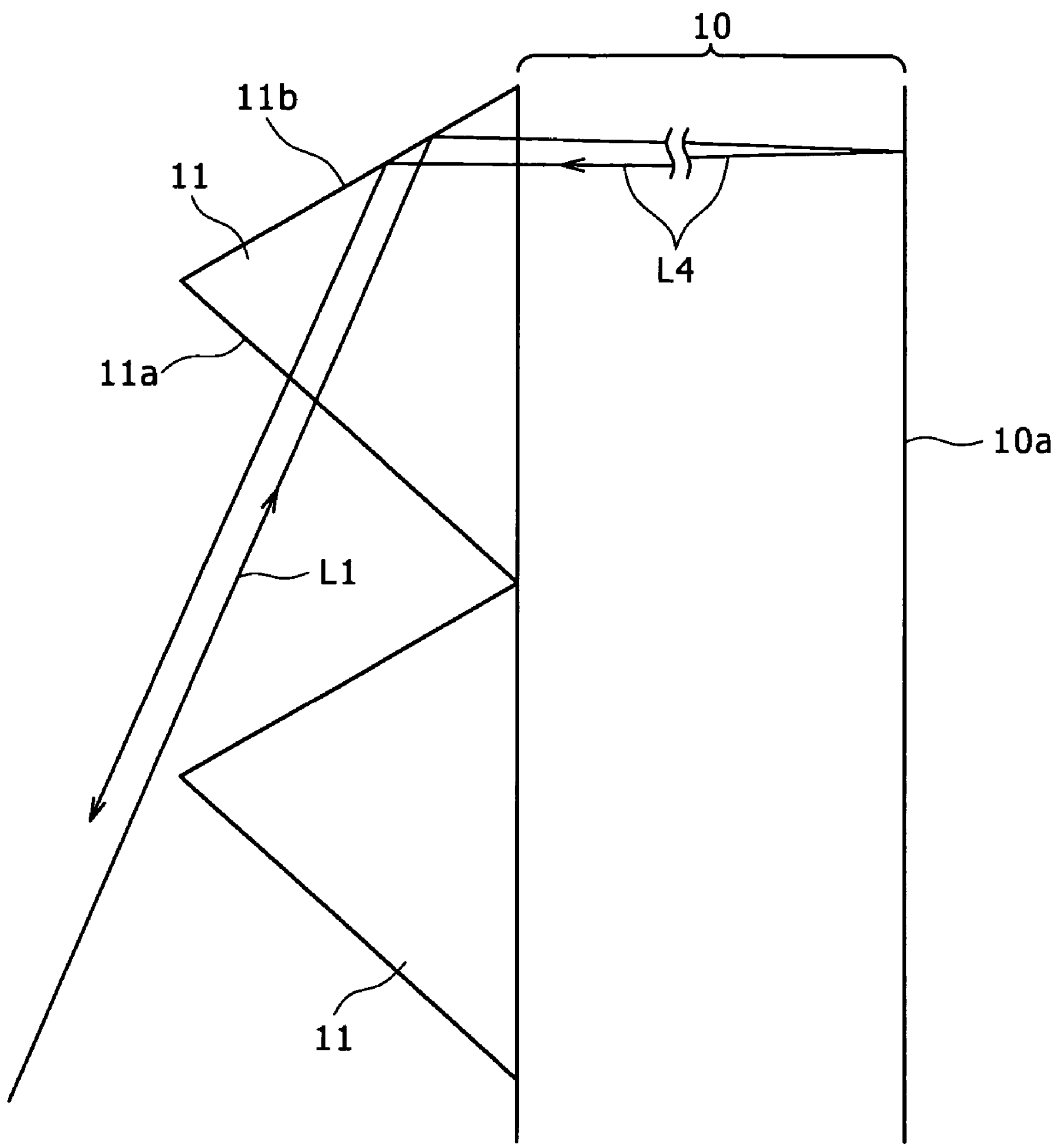
FIG. 4 is a schematic view illustrating a manner in which appearance of stray light when light emerges from the Fresnel lens sheet of FIG. 2 is suppressed.

FIG. 4 illustrates a manner in which appearance of stray light when image light emerges from the Fresnel lens sheet 5 is suppressed. Of image light L1 entering the Fresnel lens sheet 5, image light refracted and reflected by the refracting face 11*a* and the reflecting face 11*b* of a prism 11, respectively, comes to the emergence face 10*a* of the substrate 10. However, part L4 of the image light coming to the emergence face 10*a* is reflected by the emergence face 10*a* and returns to the original prism 11.

However, from the relationship between the angle $\theta 4$ of the reflecting face 11*b* and the angle $\theta 5$ of the refracted light described hereinabove, the returning light L4 to the original prism 11 returns, at all locations of the Fresnel lens sheet 5, to a position displaced to the extremity of the prism 11 from the original reflected position of the reflecting face 11*b*. Accordingly, the returning light L4 advances, after it is refracted by the refracting face 11*a*, at a place spaced from the adjacent prism 11 by a greater amount than at the place at which it has entered the Fresnel lens sheet 5.

Figure 13:
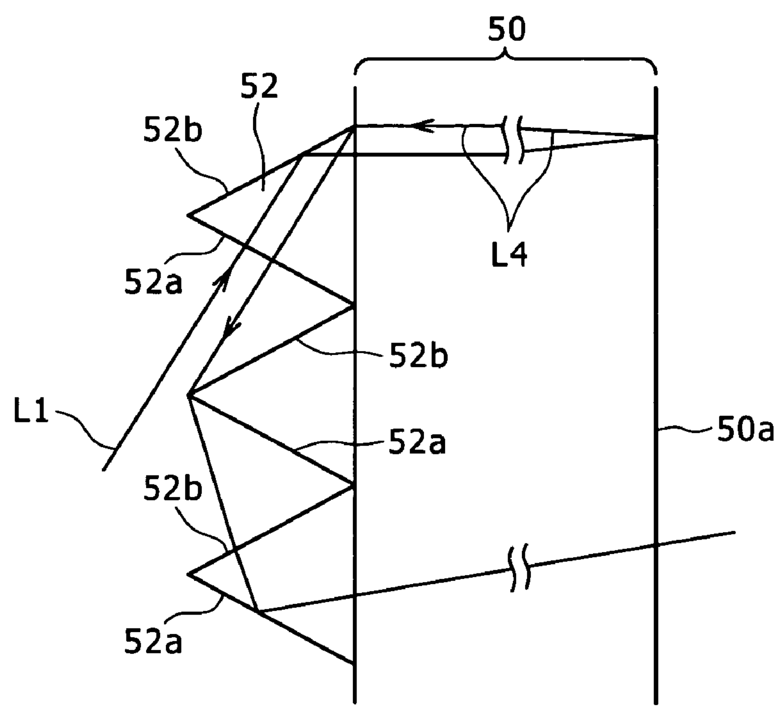
FIG. 13 is a similar view but illustrating a manner in which stray light appears when light emerges from the Fresnel lens sheet of FIG. 11.

Consequently, such a situation that the returning light L4 enters the adjacent prism 11 as in the case of the Fresnel lens sheet in the past described hereinabove with reference to FIG. 13 is eliminated. Therefore, light reflected when it emerges from the Fresnel lens sheet 5 is suppressed from making stray light.

WORKING EXAMPLE 2

Figure 5:
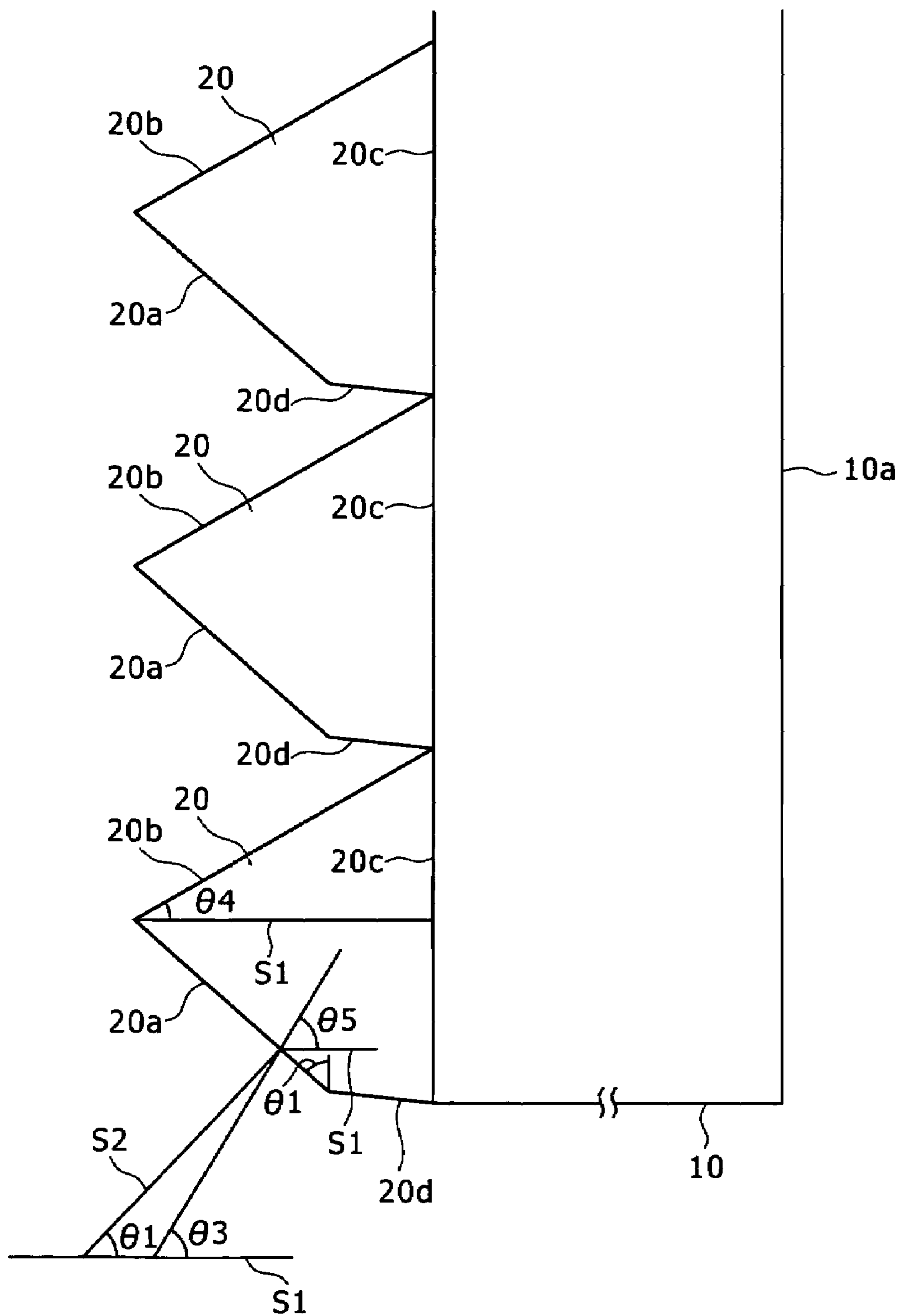
FIG. 5 is a schematic view showing a sectional structure another working example of the Fresnel lens sheet shown in FIG. 1.

Now, another working example of the Fresnel lens sheet 5 of FIG. 1 is described. FIG. 5 shows a sectional structure of the Fresnel lens sheet 5 according to the working example 2. Referring to FIG. 5, the Fresnel lens sheet 5 includes a plurality of prisms (microprisms) 20 on the light entrance face side (left side in FIG. 5) of a substrate 10 and consequently is formed as a Fresnel lens of the reflection type.

Each of the prisms 20 has a refracting face 20*a* for refracting incident light, a reflecting face 20*b* for reflecting the refracted light from the refracting face 20*a* toward the emergence face 10*a* side of the substrate 10, a third face 20*c* extending in parallel to the emergence face 10*a* for passing the reflected light from the reflecting face 20*b* therethrough, and a fourth face 20*d* positioned between the refracting face 20*a* and the third face 20*c*. In other words, each prism 20 has a cross section not of a triangular shape but of a quadrangular shape.

The angle $\theta 1$ of a perpendicular s2 to the refracting face 20*a* of each prism 20 with respect to a perpendicular s1 to the emergence face 10*a* of the substrate 10 is equal to the angle of the refracting face 20*a* with respect to the emergence face 10*a* and is 60.5°. Accordingly, the angle $\theta 1$ is smaller than any angle within the incident angular range of $\theta 3$ to $\theta 3'$ (61° to 70°) to the transmission type screen 4 of FIG. 1. Also in FIG. 5, the angle θ1 is indicated somewhat smaller than 60.5° for the convenience of illustration.

The angle θ4 of the reflecting face 20*b* of the prism 20 with respect to the emergence face 10*a* is 29°. On the other hand, at a portion of the Fresnel lens sheet 5 to which image light enters at the minimum incident angle θ3=61°, the angle θ5 of the refracted light from the refracting face 20*a* with respect to the perpendicular s1 to the emergence face 10*a* is 60.8°. Further, at any other location of the Fresnel lens sheet 5, the angle θ5 of the refracted light is greater than 60.8°. Accordingly, the angle θ4 is smaller, at all locations of the Fresnel lens sheet 5, than ½ the angle θ5 of the refracted light from the refracting face 20*a*.

Figure 6:
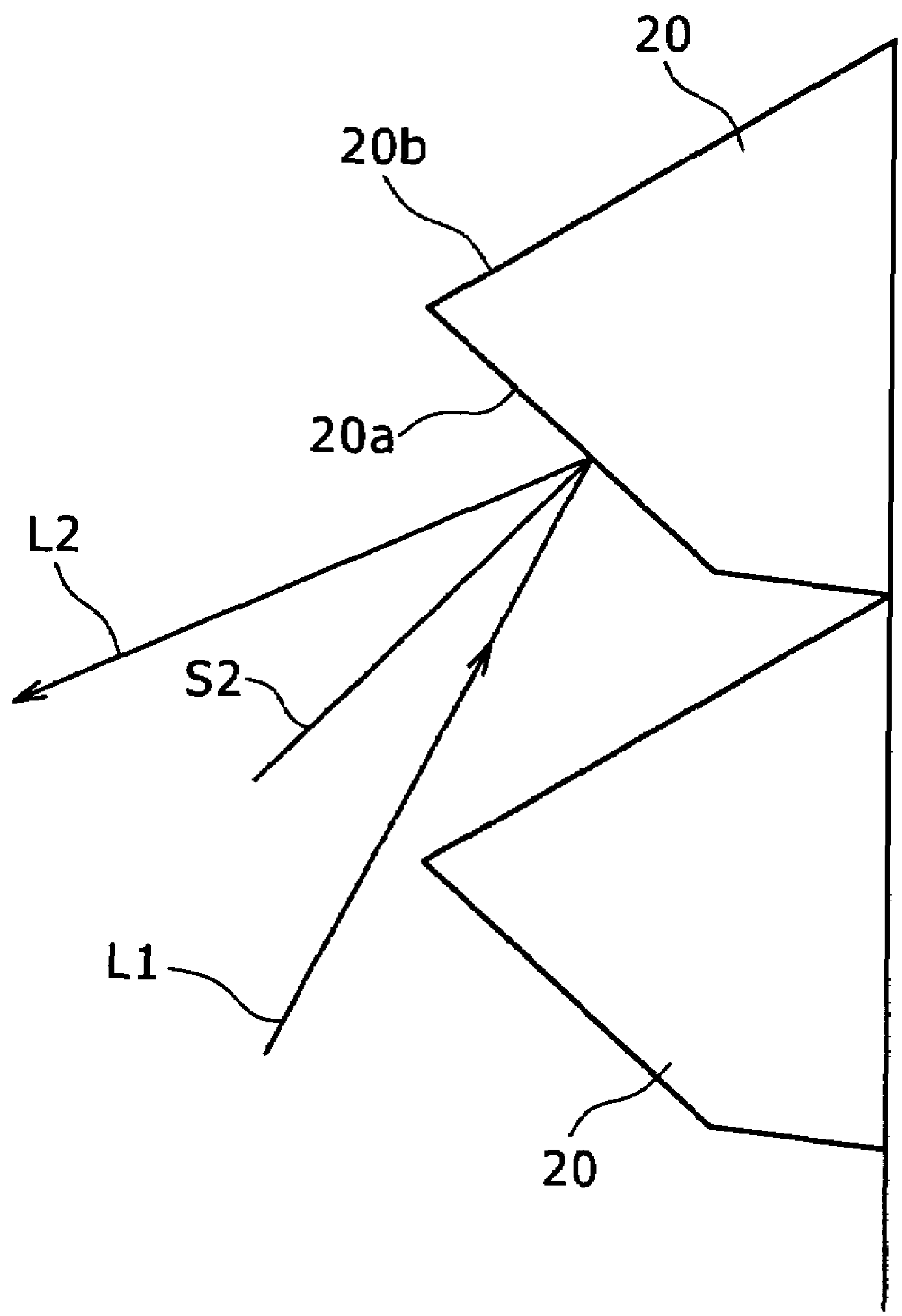
FIG. 6 is a schematic view illustrating a manner in which appearance of stray light when light enters the Fresnel lens sheet of FIG. 5 is suppressed.

FIG. 6 illustrates a manner in which appearance of stray light is suppressed when image light enters the Fresnel lens sheet 5. Referring to FIG. 6, part L2 of the image light L1 incident to the Fresnel lens sheet 5 is reflected by the refracting face 20*a* of the prism 20.

However, from the relationship between the angle θ1 of the refracting face 20*a* and the incident angular range of θ3 to θ3', the angle of the reflected light L2 at the refracting face 20*a*, that is, the angle of the emergence face 10*a* with respect to the perpendicular s1, is smaller than the incident angle of the image light L1 at all locations of the Fresnel lens sheet 5. In other words, the advancing direction of the reflected light L2 at the refracting face 20*a* is a direction in which the reflected light L2 is spaced away from the prism 20 by a greater amount when compared with the image light L1.

Consequently, such a situation that the reflected light L2 enters an adjacent prism 20 as in the case of the Fresnel lens sheet described hereinabove with reference to FIG. 12 is eliminated. Therefore, image light reflected when it enters the Fresnel lens sheet 5 can be suppressed from making stray light.

Figure 7:
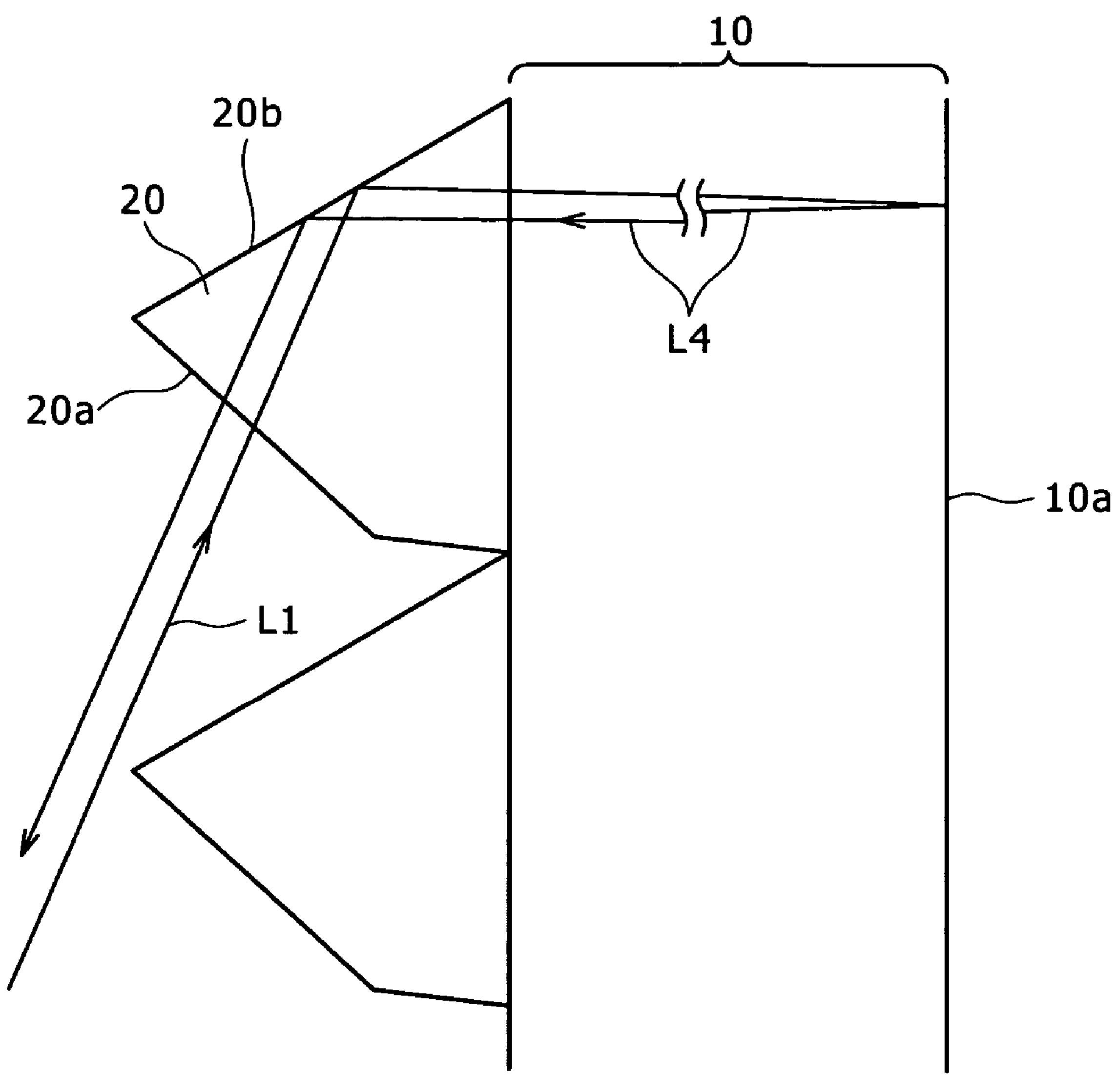
FIG. 7 is a schematic view illustrating a manner in which appearance of stray light when light emerges from the Fresnel lens sheet of FIG. 5 is suppressed.

FIG. 7 illustrates a manner in which appearance of stray light when image light emerges from the Fresnel lens sheet 5 is suppressed. Of image light L1 entering the Fresnel lens sheet 5, image light refracted and reflected by the refracting face 20*a* and the reflecting face 20*b* of the prism 20, respectively, comes to the emergence face 10*a* of the substrate 10. However, part L4 of the image light coming to the emergence face 10*a* is reflected by the emergence face 10*a* and returns to the original prism 20.

However, from the relationship between the angle θ4 of the reflecting face 20*b* and the angle θ5 of the refracted light described hereinabove, the returning light L4 to the original prism 20 returns, at all locations of the Fresnel lens sheet 5, to a position displaced toward the extremity of the prism 20 from the original reflected position of the reflecting face 20*b*. Accordingly, the returning light L4 advances, after it is refracted by the refracting face 20*a*, at a place spaced from the adjacent prism 20 by a greater amount than at the place at which it has entered the Fresnel lens sheet 5.

Consequently, such a situation that the returning light L4 enters the adjacent prism 20 as in the case of the Fresnel lens sheet in the past described hereinabove with reference to FIG. 13 is eliminated. Therefore, light reflected when it emerges from the Fresnel lens sheet 5 is suppressed from making stray light.

Further, in the present Fresnel lens sheet 5, the fourth face 20*d* is provided between the refracting face 20*a* and the third face 20*c* of each prism 20. The fourth face 20*d* can be utilized in such a manner as described in (1) to (5) below.

(1) If the length and/or the angle of the fourth face 20*d* are changed, then the angle of the refracting face 20*a* or the reflecting face 20*b* of the prism 20 with respect to the emergence face 10*a* can be adjusted arbitrarily irrespective of the pitch between adjacent ones of the prisms 20 or the end angle of the prisms 20. In other words, where the fourth face 20*d* is utilized as a face for adjustment of the shape of the prism 20, the degree of freedom in design of the refracting face 20*a* or the reflecting face 20*b* is enhanced.

Consequently, in such a case that the incident angle of image light to the transmission type screen 4 of FIG. 1 is small, for example, in such a case that the minimum incident angle θ3 is less than 60°, it is possible to set the angle θ1 of the refracting face 20*a* shown in FIG. 5 smaller than the minimum angle θ3 in a corresponding relationship so that reflected light upon entrance into the Fresnel lens sheet 5 is suppressed from making stray light.

Figure 8:
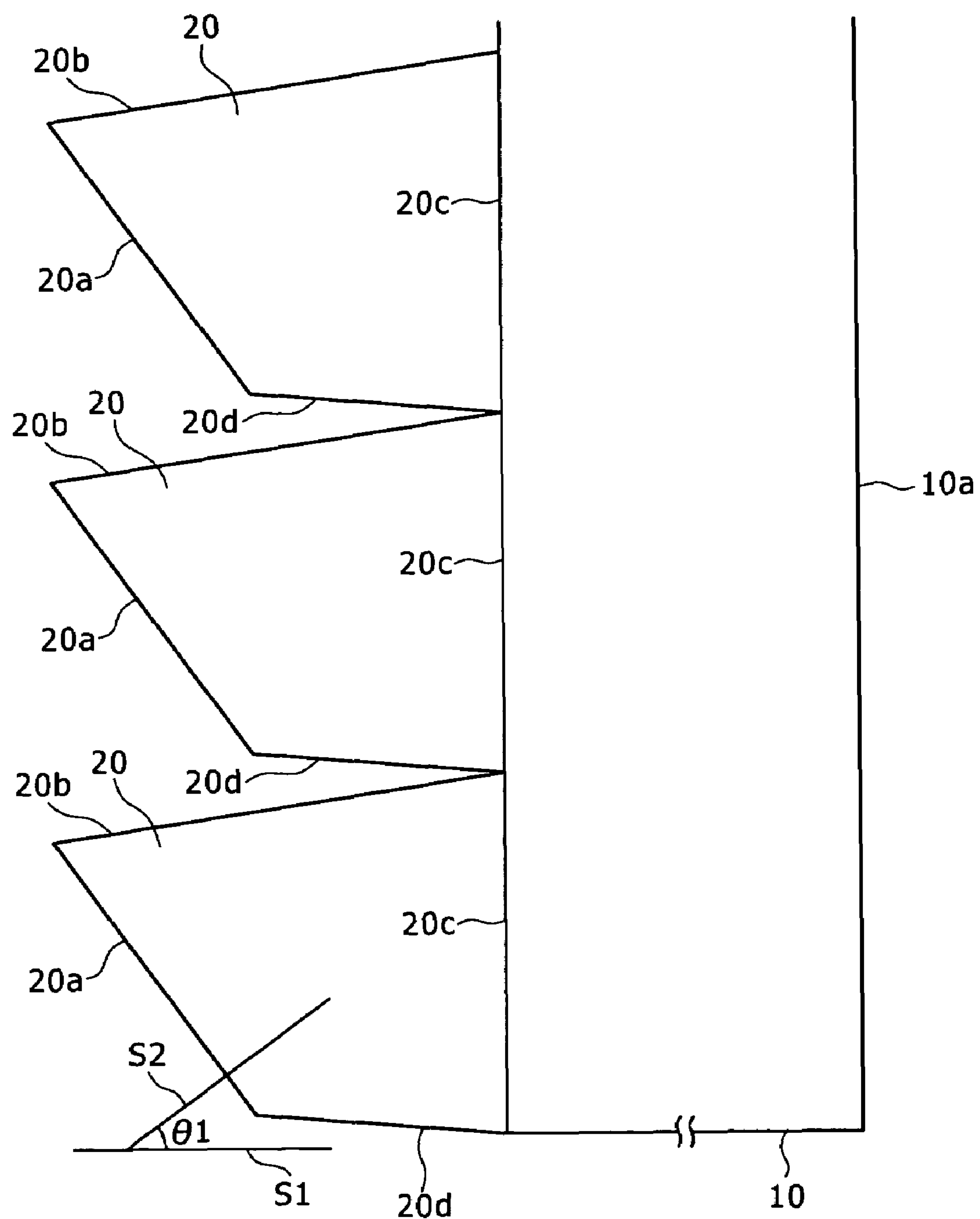
FIG. 8 is a schematic view illustrating a manner in which the angle of a refracting face is set making use of a fourth face of a prism of the Fresnel lens of FIG. 5.

FIG. 8 illustrates an example wherein the length or the angle of the fourth face 20*d* is changed while the pitch between adjacent ones of the prisms 20 shown in FIG. 5 is maintained to make the angle θ1 of the refracting face 20*a* smaller than 45°. In the example shown, even where the minimum incident angle θ3 of image light to the transmission type screen 4 of FIG. 1 is approximately 45°, reflected light when it enters the Fresnel lens sheet 5 can be suppressed from making stray light in a quite similar manner as in the case of FIG. 6.

Further, the angle of the reflecting face 20*b* can be adjusted arbitrarily to adjust the advancing direction of emerging light from the Fresnel lens sheet 5 arbitrarily irrespective of the pitch between adjacent ones of the prisms 20 or the end angle of the prisms 20.

(2) If the length and/or the angle of the fourth face 20*d* are changed, then the pitch between adjacent ones of the prisms 20 or the height of the prisms 20 can be set arbitrarily without changing the angle of the refracting face 20*a* or the reflecting face 20*b*.

(3) Generally, in a Fresnel lens sheet of the reflection type, where the incident angle of light is small, if the entire sheet is in an inclined state or the entire lens faces of the prisms are in an inclined state, then the incident light sometimes passes, after it is refracted by the refracting faces of the prisms, through the prisms as it is without coming to the reflecting faces from a cause of an error in dimension upon production of the prisms or an error in mounting of the prisms on the substrate. This passage of light through the prisms can be prevented if the regions of the reflecting faces which are actually used for reflection are narrowed by adjusting the pitch between adjacent ones of the prisms or the height of the prisms. However, where the prisms have a triangular sectional shape, since the degree of freedom in design is low, such adjustment of the pitch or the height is not easy. In contrast, with the Fresnel lens sheet 5 described above, since the degree of freedom in design is increased by the presence of the fourth face 20*d* and a Fresnel lens sheet having a greater margin can be designed, such passage of light as described above can be prevented.

(4) Since the angle of the fourth face 20*d* can be set such that the prisms 20 have an arbitrary draft angle, production of a metal mold for forming the prisms 20 is facilitated and also taking out of the prisms 20 from the metal mold is facilitated.

Figure 14:
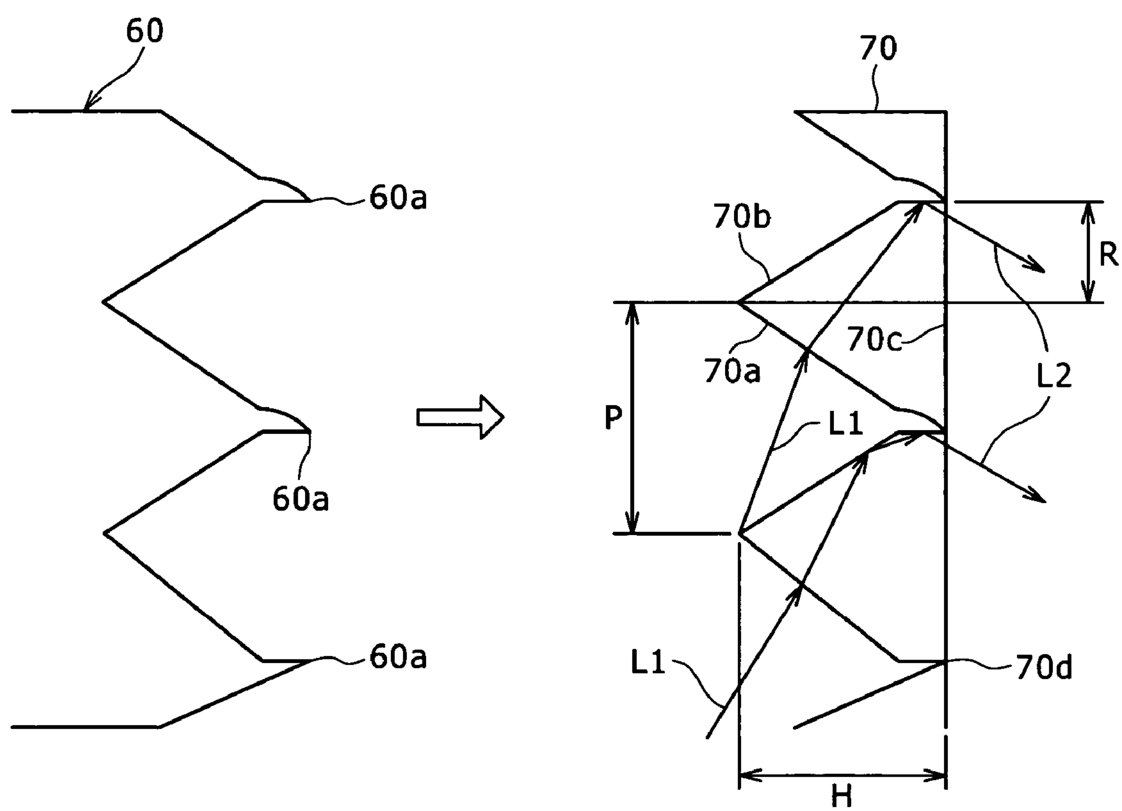
FIG. 14 is a schematic view illustrating a deviation of the angle of a reflecting face of a prism which is caused by a bend of an end of a metal mold.
Figure 15:
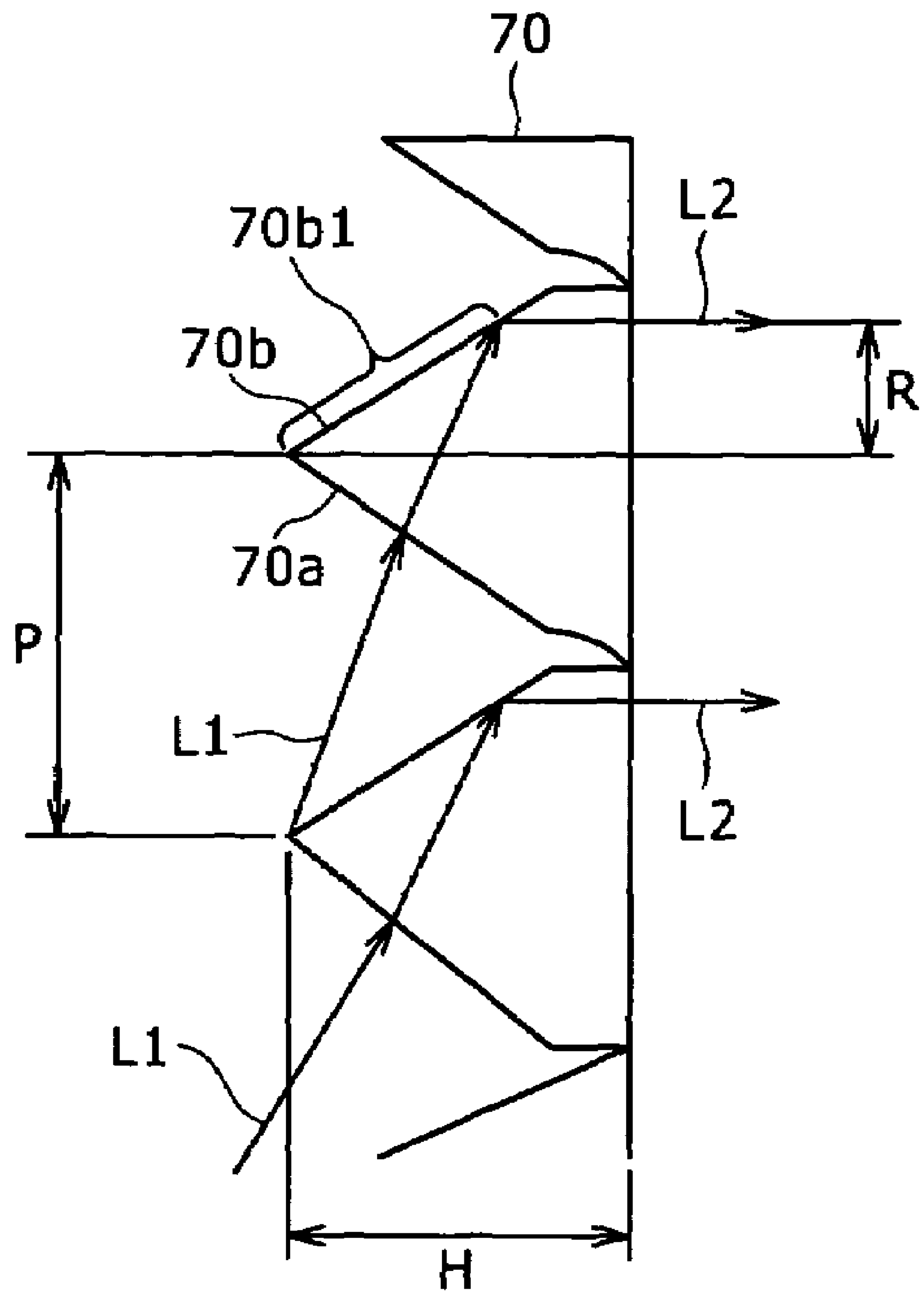
FIG. 15 is a schematic view illustrating a state wherein a utilization region of a reflecting face is narrowed.

(5) As seen in FIG. 14, when a metal mold 60 for molding of prisms is worked, a problem that a tip portion 60*a* of the metal mold 60 is bent or curved occurs frequently. A Fresnel lens sheet having prisms 70 molded using such a metal mold 60 as described above has a problem in that, since the angle of part of the reflecting face 70*b* of a prism 70 is deviated, that is, since an apex 70*d* defined by the reflecting face 70*b* and the third face 70*c* is deformed, the reflected light L2 makes stray light or a ray of light is disturbed to cause a line to be formed on an image, resulting in deterioration of the picture quality. If the pitch P between adjacent ones of the prisms 70 or the height H of the prisms 70 is adjusted as seen in FIG. 15 to narrow a region **70*b*1 to be actually utilized for reflection from within the reflecting face 70*b* so as not to utilize the region in which the angle is deviated, then even if the apex is in a somewhat deformed condition, this does not have an influence on the reflected light L2. Consequently, appearance of such stray light or a line on an image as described above can be prevented. However, such adjustment as described above is not easy with the prisms 70 having a triangular cross section because the degree of freedom in design is low. In contrast, with the Fresnel lens sheet 5, since the presence of the fourth face 20*d*** increases the degree of freedom in design and makes it possible to design a Fresnel lens sheet having a greater margin, even if the finish of the metal mold is not very good, it is easily possible to prevent appearance of such stray light or of a line on an image as described above thereby to prevent deterioration of the picture quality.

It is to be noted that, while, in the working examples described above, reflected light from the reflecting face of a prism passes through the third face (transmission face) of the prism and emerges as it is from the Fresnel lens sheet 5. However, a diffusing layer for diffusing image light having passed through the third face of the prism may be provided at a position displaced toward the emergence face **10*a* from the prism of the Fresnel lens sheet 5**.

Figure 9:
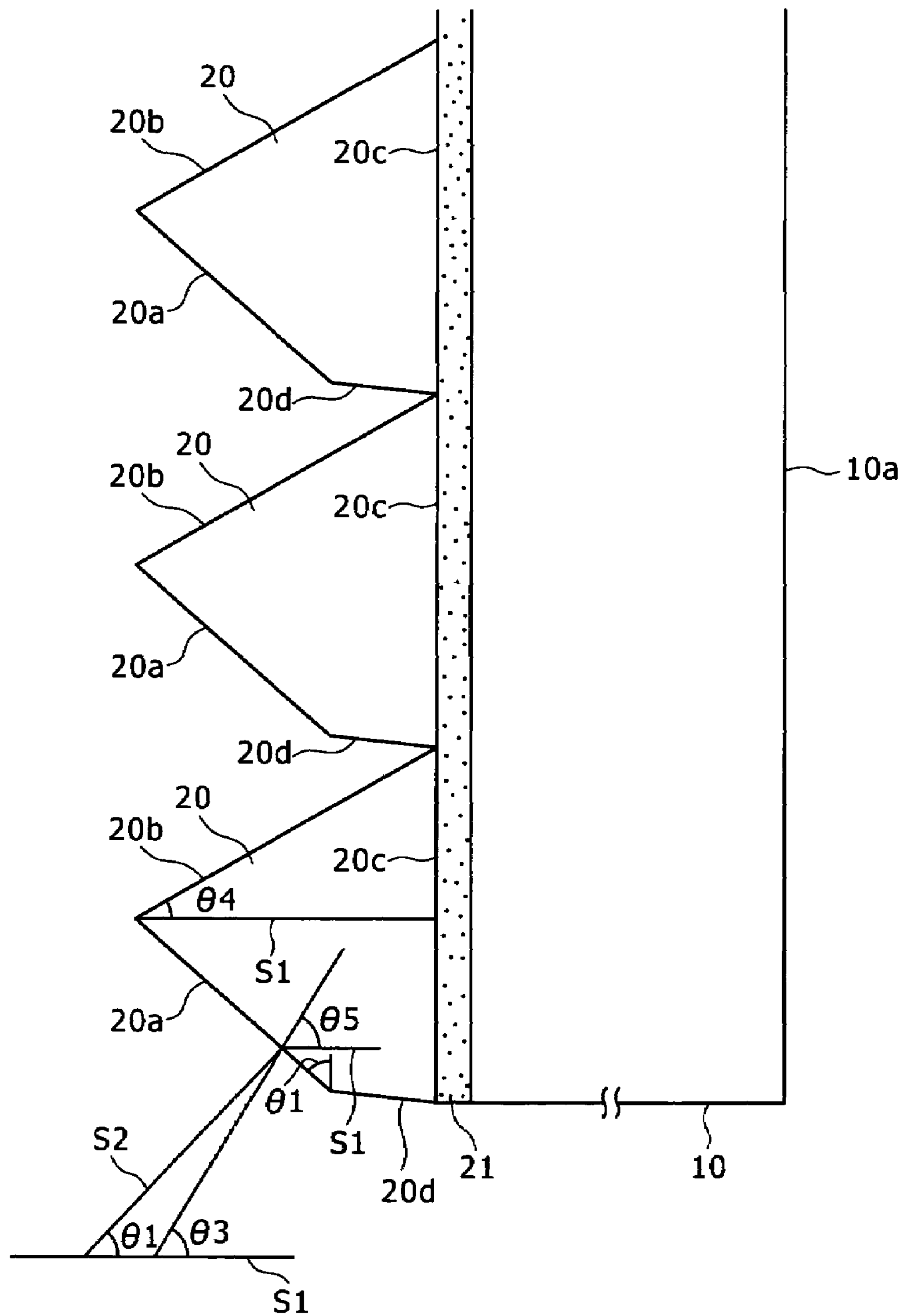
FIG. 9 is a schematic view showing a modified form of the Fresnel lens sheet of FIG. 5 wherein a diffusion layer is provided additionally.
Figure 10:
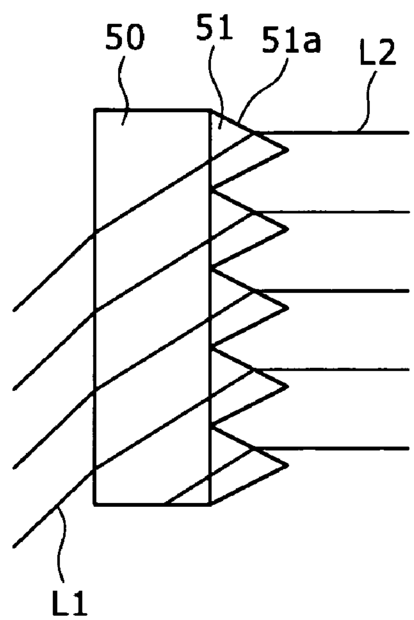
FIG. 10 is a schematic view showing a general configuration of a popular Fresnel lens sheet of the refraction type.
Figure 11:
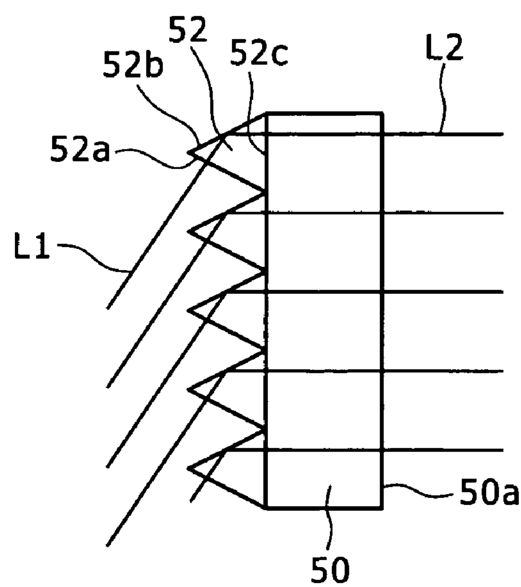
FIG. 11 is a similar view but showing a general configuration of a popular Fresnel lens sheet of the reflection type.

FIG. 9 shows an example wherein such a diffusing layer 21 as just described is provided between the prisms 20 and the substrate 10 of the Fresnel lens sheet 5 according to the working example shown in FIG. 5. The diffusing layer 21 is formed by disposing, in the inside of a binder, particles having a refractive index different from that of the binder. Where the diffusing layer 21 is provided, image light having passed through the third face **20*c* of a prism 20 is diffused by the diffusing layer 21 and emerges from the Fresnel lens sheet 5. Consequently, the angular field of view of the transmission type screen 4 of FIG. 1** can be expanded.

Further, since also light reflected by the emergence face **10*a* of the substrate 10 when it emerges from the substrate 10 is diffused by the diffusing layer 21, the amount of light (returning light) returning to the prism 20 from within the reflected light decreases. Accordingly, it can be suppressed further that, when light emerges from the Fresnel lens sheet 5**, part of the light reflected makes stray light.

Further, on the fourth faces **20*d* of the prisms 20 of the Fresnel lens sheet 5 shown in FIG. 5, an antiglare layer for diffusing incident light may be formed by disposing, on the surface of a binder, particles having a refractive index equal to that of the binder so as to provide a suitable degree of roughness to the surface of the binder or the surface itself of the fourth face 20*d* may be worked so as to become roughened. Since light incident to the fourth face 20*d* is diffused and reflected by the fourth face 20*d***, appearance of stray light can be suppressed further.

Further, in the working examples described above, the angle θ1 of the refracting face of each prism with respect to the emergence face **10*a* of the substrate 10 is set smaller than any angle within the incident angular range θ3 to θ3' (61° to 70°) to the transmission type screen 4 of FIG. 1. However, the angle θ1 of each prism may otherwise be set to an angle equal to or greater than the minimum incident angle θ3 but equal to smaller than the maximum incident angle θ3' such as for example, to 65° or to the maximum incident angle θ3'. Also in this instance, at a location of the Fresnel lens sheet 5 at which the incident angle of image light is greater than this fixed angle, appearance of stray light when image light enters and emerges can be suppressed similarly as described hereinabove with reference to FIGS. 3 and 4 or 6 and 7**.

Or, the angle θ1 of the refracting face of each prism may be equal to a certain fixed angle within the incident angular range θ3 to θ3' such as, for example, 61°. Also at a location at which the angle θ1 of the refracting face is equal to the incident angle of light, the advancing direction of reflected light at the refracting face becomes same as the direction of the incident light, and therefore, the reflected light does not enter an adjacent prism. Consequently, also in this instance, appearance of stray light when image light enters the Fresnel lens sheet 5 can be suppressed.

Further, while, in the working examples described above, the angle θ1 of the refracting face of each prism of the Fresnel lens sheet is set smaller than the incident angular range to the transmission type screen 4, the angle θ1 of the refracting face may otherwise be set smaller than or equal to the incident angle of light at the position only of some prisms.

Further, while, in the working examples described above, the angle θ4 of the reflecting face of each prism is set smaller than ½ the angle θ5 of refracted light from the refracting face of the prism. However, the angle θ4 of the reflecting face may otherwise be set equal to ½ the angle θ5 of the refracted light. Also in this instance, returning light from the emergent face of the Fresnel lens sheet returns to the same position as the original reflecting position of the reflecting face, and after the returning light is refracted by the reflecting face, it advances along the same light path as that when the light has entered the Fresnel lens sheet. Therefore, the returning light cannot enter an adjacent prism. Accordingly, appearance of stray light when light emerges from the Fresnel lens sheet 5 can still be suppressed.

Further, in the working examples described above, the angle θ4 of the reflecting face is set smaller than ½ the angle θ5 of refracted light at each prism of the Fresnel lens sheet. However, the angle θ4 of the reflecting face may otherwise be set smaller than or equal to ½ the angle θ5 of refracted light only at some of the prisms.

Further, in the working examples described above, an antiglare layer or an AR layer (antireflective coating layer) may be provided on the emergence face **10*a* of the substrate 10. The antiglare layer or AR layer can suppress reflection of light on the emergence face 10*a*** side, and stray light can be suppressed.

Furthermore, in the examples described hereinabove, the present invention is applied to a rear projection type display apparatus. However, the Fresnel lens sheet or the transmission type screen according to the present invention can be used also in applications other than the rear projection type display apparatus.

While preferred embodiments of the present invention have been described using specific terms, such description is for illustrative purpose only, and it is to be understood that changes and variations may be made without departing from the spirit or scope of the following claims.

What is claimed is:

1. A display apparatus, comprising:

a light source for emitting incident light in a direction; and a Fresnel lens sheet for converting the incident light into parallel light, the Fresnel lens sheet comprising:

a substrate having a light entrance face and a light emergence face; and a plurality of prisms arrayed on the light entrance face side of the substrate, each of the prisms having a refracting face for refracting the incident light, a reflecting face for reflecting the refracted light toward the light emergence face, and a passing face for passing the reflected light therethrough;

wherein at least some of the prisms are configured such that;

a first angle between a line perpendicular to the refracting face and a line perpendicular to the emergence face is smaller than a second angle between a line parallel to the direction of the incident light and the line perpendicular to the emergence face, and a third angle between a line parallel to the reflecting face and the line perpendicular to the emergence face is smaller than one-half of a fourth angle between a line parallel to a direction of the refracted light and the line perpendicular to the emergence face.

2. A display apparatus, comprising:

a light source for emitting incident light in a direction; and a Fresnel lens sheet for converting the incident light into parallel light, the Fresnel lens sheet comprising:

a substrate having a light entrance face and a light emergence face; and a plurality of prisms arrayed on the light entrance face side of the substrate, each of the prisms having a refracting face for refracting the incident light, a reflecting face for reflecting the refracted light toward the light emergence face, a third face for passing the reflected light therethrough, and a fourth face positioned between the retracting face and the third face;

at least some of the prisms being configured such that a first angle between a line a perpendicular to the refracting face and a line perpendicular to the emergence face is smaller than a second angle between a line parallel to the direction of the incident light and the line perpendicular to the emergence face.

3. The display apparatus according to claim 2, wherein the at least some of the prisms are further configured such that a third angle between a line parallel to the reflecting face and the line perpendicular to the emergence face is smaller than one-half of a fourth angle between a line parallel to a direction of the refracted light and the line perpendicular to the emergence face.

4. A transmission screen device, comprising:

a light source for emitting incident light in a direction; and a Fresnel lens sheet for converting the incident light into parallel light, the Fresnel lens sheet comprising:

a substrate having a light entrance face and a light emergence face, and a plurality of prisms arrayed on the light entrance face side of the substrate, each of the prisms having a retracting face for refracting the incident light, a reflecting face for reflecting the refracted light toward the light emergence face, and a passing face for passing the reflected light therethrough;

wherein at least some of the prisms are configured such that:

a first angle between a line perpendicular to the retracting face and a line perpendicular to the emergence face is smaller than a second angle between a line parallel to the direction of the incident light and the line perpendicular to the emergence face, and a third angle between a line parallel to the reflecting face and the line perpendicular to the emergence face is smaller than one-half of a fourth angle between a line parallel to a direction of the refracted light and the line perpendicular to the emergence face.

5. A transmission screen, comprising:

a light source for emitting incident light in a direction; and a Fresnel lens sheet for converting the incident light into parallel light, the Fresnel lens sheet comprising:

a substrate having a light entrance face and a light emergence face, and a plurality of prisms arrayed on the light entrance face side of the substrate, each of the prisms having a retracting face for retracting the incident light, a reflecting face for reflecting the refracted light toward the light emergence face, a third face for passing the reflected light therethrough, and a fourth face positioned between the retracting face and the third face;

at least some of the prisms being configured such that a first angle between a line a perpendicular to the retracting face and a line perpendicular to the emergence face is smaller than a second angle between a line parallel to the direction of the incident light and the line perpendicular to the emergence face.

6. The transmission type screen according to claim 5, wherein the at least some of the prisms are further configured such that a third angle between a line parallel to the reflecting face and the line perpendicular to the emergence face is smaller than one-half of a fourth angle between a line parallel to a direction of the refracted light and the line perpendicular to the emergence face.

7. A rear projection display apparatus, comprising:

an image light source for emitting image light in a direction; and a transmission screen having a rear side to which the image light is projected, the transmission screen including a Fresnel lens sheet for converting the image light into parallel light, the Fresnel lens sheet comprising:

a substrate having a light entrance face and a light emergence face, and a plurality of prisms arrayed on the light entrance face side of the substrate, each of the prisms having a refracting face for refracting the image light, a reflecting face for reflecting the refracted light toward the light emergence face side of said substrate, and a third face for passing the reflected light therethrough;

wherein at least some of the prisms are configured such that:

a first angle between a line perpendicular to the refracting face and a line perpendicular to the emergence face is smaller than a second angle between a line parallel to the direction of the image light and the line perpendicular to the emergence face, and a third angle between a line parallel to the reflecting face and the line perpendicular to the emergence face is smaller than one-half of a fourth angle between a line parallel to a direction of the refracted light and the line perpendicular to the emergence face.

8. A rear projection display apparatus, comprising:

an image light source for emitting image light in a direction; and a transmission screen having a rear side to which the image light is projected, the transmission screen including a Fresnel lens sheet for converting the image light into parallel light, the Fresnel lens sheet comprising:

a substrate having a light entrance face and a light emergence face, and a plurality of prisms arrayed on the light entrance face side of the substrate, each of the prisms having a refracting face for refracting the incident light, a reflecting face for reflecting the refracted light toward the light emergence face, a third face for passing the reflected light therethrough, and a fourth face positioned between the refracting face and the third face;

at least some of the prisms being configured such that a first angle between a line a perpendicular to the refracting face and a line perpendicular to the emergence face is smaller than a second angle between a line parallel to the direction of the image light and the line perpendicular to the emergence face.

9. The rear projection display apparatus according to claim 8, wherein the at least some of the prisms are further configured such that a third angle between a line parallel to the reflecting face and the line perpendicular to the emergence face is smaller than one-half of a fourth angle between a line parallel to a direction of the refracted light and the line perpendicular to the emergence face.

* * * * *